Dec. 12, 1961        A. A. MAGILL ET AL        3,012,468
APPARATUS FOR DYNAMIC OPTICAL SENSING OF
NONALIGNMENT OF ROTATING BODIES
Filed Nov. 26, 1958        2 Sheets-Sheet 1
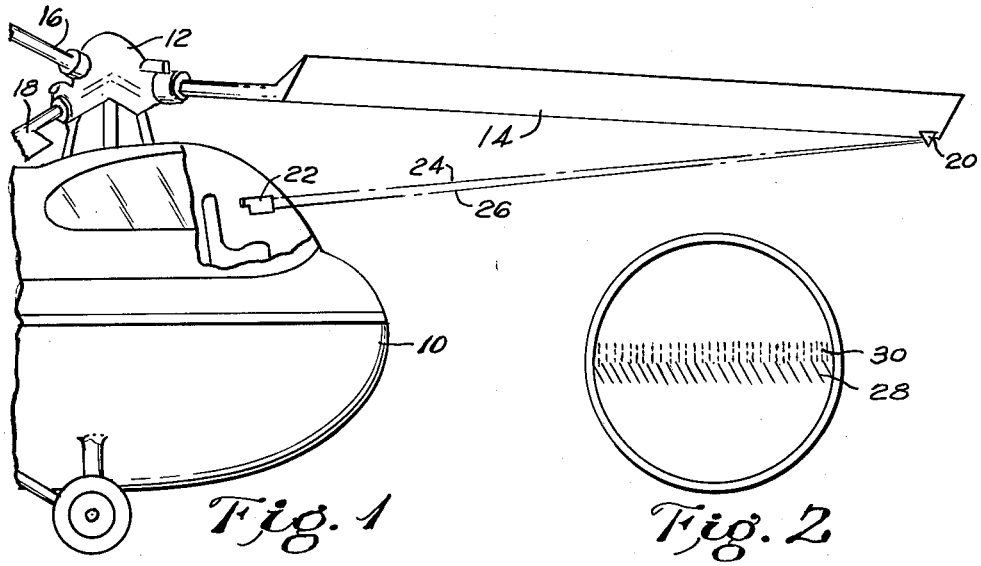
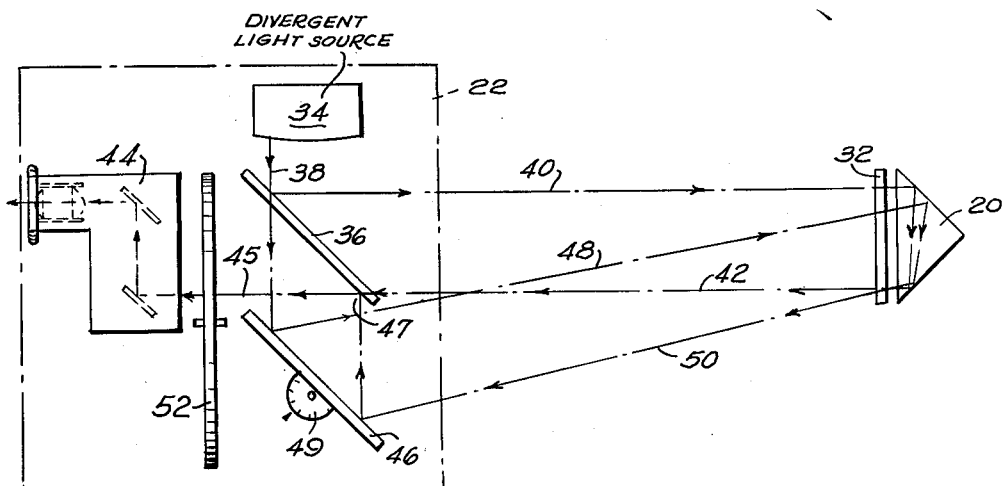
A. A. Magill,
J. S. Hellen,
W. T. Owens
INVENTORS
BY Homer R. Montague
ATTORNEY Dec. 12, 1961  A. A. MAGILL ET AL  3,012,468
APPARATUS FOR DYNAMIC OPTICAL SENSING OF
NONALIGNMENT OF ROTATING BODIES
Filed Nov. 26, 1958  2 Sheets-Sheet 2

INVENTORS:
A. A. Magill
BY J. S. Hellen
W. T. Owens

Homer L. Montague
ATT'Y.

United States Patent Office 3,012,468
Patented Dec. 12, 1961

3,012,468
APPARATUS FOR DYNAMIC OPTICAL SENSING OF NONALIGNMENT OF ROTATING BODIES
Arthur A. Magill, Hicksville, N.Y., James S. Hellen, Packanack Lake, N.J., and William T. Owens, Huntington, N.Y., assignors to Fairchild Camera and Instrument Corporation, a corporation of Delaware
Filed Nov. 26, 1958, Ser. No. 776,515
6 Claims. (Cl. 88—14)

The present invention pertains generally to apparatus for dynamic sensing of the nonalignment of one or more of a plurality of rotating bodies or of one or more elements of a single rotating body, and more particularly to apparatus of this general type wherein optical sensing means are employed.

The prior art affords many examples of devices for sensing rotational nonalignment, the more common types employing either mechanical, optical or magnetic sensing means. While both the mechanical and magnetic devices have proved satisfactory for many applications, in each type of such sensing devices there is usually found a rather large bulk of equipment necessary for satisfactory performance, and in addition such equipment must usually be closely adjacent the rotating body or bodies whose nonalignment is to be sensed. In the optical equipments of the prior art the latter of these limitations has usually been eliminated, but in most cases there is still a necessity for providing for one or more photosensitive electron tubes and electronic amplifiers for amplifying the outputs thereof for application to suitable indicating instruments, as well as the power supply circuitry necessary for operation thereof, resulting in equipment of considerable size and shape.

Furthermore, most of the devices of the prior art merely provide an indication that one or more of the rotary elements are out of the desired alignment, without affording any identification of which one or ones. In the cases of those equipments which do identify the nonaligned elements, there is usually required additional mechanical or electrical means for coordinating the phasing of the rotary element or elements under test with one or more portions of the testing device.

It is accordingly a principal object of the present invention to provide simple and lightweight apparatus for the dynamic sensing of rotational nonalignment of one or more of a plurality of rotating elements.

Another object of the invention is to provide apparatus of the above type by means of which identification may easily be made of the particular elements which are found to be out of the desired alignment.

Still another object of the invention is to provide apparatus for optically sensing rotational nonalignment of one or more of a plurality of rotating elements wherein means for transmitting and receiving light energy are included within a unitary, lightweight housing which may easily be hand-held in the normal use thereof.

In accordance with the present invention, the above and other objects are achieved by means of a reflector mounted on each of the rotary elements whose alignment is to be tested, and a portable means for directing light energy upon such reflectors and for receiving the light reflected therefrom. These reflectors are so positioned on their respective rotary elements as to rotate in predetermined relative paths in the absence of any nonalignment in the several rotating elements. Where one or more of these elements is not in the desired alignment, the light reflected from the reflector mounted thereon will be displaced from its desired path by an amount corresponding to the amplitude of the nonalignment. In order that identification may be made of the particular elements that are out of the desired alignment, each of the reflectors has mounted thereon a color filter which passes a portion of the spectrum of the incident light different from that of each of the other reflectors In a preferred form of the invention, the several reflectors are so positioned as to reflect the incident light (or, rather, a respective portion thereof) back to a point of observation in a common plane in the absence of nonalignment of the rotary elements. Where one or more of the elements are not in the proper alignment, one or more corresponding color bands will appear to one side or the other of the original common band of reflected light. Thus, identification of the nonaligned elements may be made, and an indication is given of the relative amount of nonalignment in each case.

With the above considerations and objects in mind, the invention itself will now be described in connection with a preferred embodiment thereof given by way of example and not of limitation, and with reference to the accompanying drawings, in which:

FIG. 1 is an elevation view of one form of the apparatus of the invention as applied to the sensing of alignment of a plurality of blades of a helicopter rotor assembly.

FIG. 2 is a representation of an alignment indication viewed by the observer in FIG. 1.

FIG. 3 is a schematic drawing of the optical system of the apparatus of the invention.

Figure 4:
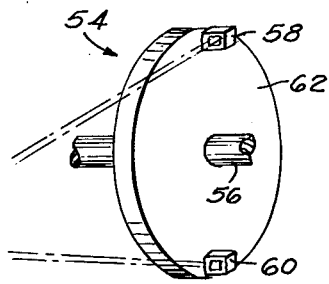
FIG. 4 is a perspective view of a single rotary body with portions of the apparatus of the invention attached thereto for sensing nonsymmetry in such body.

Referring now to FIG. 1, the apparatus of the invention is shown in use in connection with a helicopter. For reasons of balance to eliminate excessive vibration in the operation of a helicopter or the like, it is highly desirable that corresponding elements (such as the outer tips) of the rotor blades rotate in a common plane. As a practical matter, it is also very desirable to be able to test the alignment of such rotor blades while the craft is experiencing actual flight conditions. As may be seen, the apparatus of the present invention is particularly adaptable to the observation of rotor blade alignment in a helicopter, and may equally well be used in flight or on the ground, and either during the day or at night. In FIG. 1, there is shown a helicopter 10 having a rotary drive assembly 12 carrying three rotor blades 14, 16 and 18. Secured to the under surface of each of these blades and near the tip thereof is a small reflector means, only one of which is visible in FIG. 1 at 20. For reasons which will be better understood in connection with the description that follows, each of these reflectors is preferably a corner reflector, which has the characteristic of reflecting incident light in a direction parallel to that of the incident ray.

Within the cockpit of helicopter 10 there is provided a small, portable housing 22 which, together with the several corner reflector elements, forms the apparatus of a preferred form of the invention. While the contents of housing 22 will be explained in greater detail in connection with FIG. 3, a general understanding of the invention will be gained by a brief description at this point. The major components within housing 22 are a means for directing a light beam toward the several reflectors on the rotor blades, and a viewing device for viewing the light reflected thereby. Since housing 22 is portable, it may be hand-held and aimed at the blade tips from within the cockpit of helicopter 10. When properly aimed, housing 22 emits light along a path generally indicated at 24 in FIG. 1, which light energy strikes corner reflector 20 and is returned toward housing 22 along a path generally indicated at 26. While these two light paths may actually be beams of restricted width or cross section, it is generally preferable to employ a divergent light source in housing 22 so that, among other advantages, the aiming of the housing and the light emanating therefrom is not as critical.

As each of the three blades swings around into the vertical plane in which the light beam 24 is aimed, the corner reflector thereon will be illuminated by the beam, and a corresponding return beam will be reflected back to the viewing device in housing 22. Since the light source within the housing is divergent, the reflected "beam" will in reality be a horizontal streak or band of light, assuming the helicopter to be upright and the blades to be rotating in a horizontal plane. If, on the other hand, collimated light were to be utilized, then not only would incident light beam 24 have to be accurately aimed in the vertical plane, but the return "beam" 26 would be relatively restricted in its horizontal transverse direction so as to present only a spot of reflected light instead of a horizontal band. As will be apparent, the relative positions of the reflections from the several reflectors will be more easily discernable as between bands of light rather than between mere spots. In order that the blades may be identified by means of the light reflected by each, each of the corner reflectors has a color filter mounted thereover (not shown in FIG. 1), with each of the filters passing a different portion of the spectrum of the incident light. Assuming for the sake of explanation of the apparatus that the light energy emanating from the divergent source in housing 22 is ordinary visible light, and that the color filters on the respective corner reflectors of FIG. 1 pass red, blue and yellow respectively, then if the three rotor blades of helicopter 10 are in alignment and therefore travelling in a common path, the light reflected by such reflectors will appear as a horizontal band of light having a color represented by a mixture of red, blue and yellow. If however, one of the rotor blades (for example, the one carrying corner reflector 20) is lower than the other two, then a separate band of light will appear below the original. Assuming the lower blade to be carrying the corner reflector with the green filter, then a green streak or band 28 will appear below the violet streak 30 (see FIG. 2) which results from the combination of the light reflected by the red and blue reflector assemblies. If no two of the rotor blades of helicopter 10 are in alignment, then three separate color bands would appear in the viewing device in housing 22. This blending of colors assumes a sufficiently high speed of rotation to permit the retentivity of the eye to effect the blend; of course, where such speed is not achieved, the reflected light will appear more in the form of multicolored streaks.

In order to afford a better understanding of the apparatus of the invention, reference will now be made to FIG. 3. The several components of housing 22 are now seen in some detail, and are collected together within the area enclosed by the dashed line labelled 22. Corner reflector 20 referred to in connection with FIG. 1 is also shown, along with the green color filter 32 which is mounted thereon. Situated in front of divergent light source 34 is a semi-transparent mirror or beam splitter 36 which reflects a portion of the light from source 34 while transmitting another portion therethrough. For the sake of clarity in description, only one light ray 38 emanating from source 34 will be referred to, it being understood that other rays from such source will be reflected and transmitted throughout the optical system herein in a similar manner. That portion of light ray 38 which is reflected by semitransparent mirror 36 is reflected along path 40 until it strikes corner reflector 20, to be returned along path 42 through mirror 36 to a suitable viewing device such as a monocular 44. Of course, a portion of the light travelling along path 42 will be reflected back into light source 34 by mirror 36, and this portion of the reflected light is therefore lost.

In order to offset this loss in part, a second planar mirror 46, which is preferably of the front-surface type, is positioned behind planar semi-transparent mirror 36 so as to be illuminated by the light passing through the latter. Mirror 46 is nearly parallel to mirror 36, and in particular, it is so oriented as to reflect the light transmitted through mirror 36 in the proper direction to also illuminate the corner reflector 20. Thus, that portion of light ray 38 which is transmitted through semitransparent mirror 36 is reflected along path 48 by mirror 46. As this light strikes corner reflector 20, it is returned along parallel path 50 to be reflected by mirror 46 and the under surface of mirror 36 to coincide with the light energy travelling along path 42 to thereby reinforce the reflection viewed in viewing device 44. Here, again, a portion of the light striking the under surface of semi-transparent mirror 36 is not reflected, but is transmitted therethrough and back into the light source 34. However, the original reflection is substantially reinforced, and the efficiency of the apparatus is thereby increased.

As shown in FIG. 3, where conditions make it desirable, a color filter wheel 52 or the like may be placed in front of the viewing device 44. Color filter 52 has portions corresponding in number and light-filtering characteristics to the several light filters mounted on the respective corner reflectors described in connection with FIG. 1, whereby the particular reflection from each of the several corner reflectors may more easily be identified.

As will readily be apparent to those skilled in the art, the present invention is not limited to the sensing of nonalignment of a plurality of separate and distinct rotating members, but may equally well be employed where it is desired to inspect a single rotating body for any lack of symmetry therein. In this connection, reference is now made to FIG. 4, wherein there is shown a rotating disc 54 or the like mounted for rotation about an axle 56. A pair of corner reflectors 58 and 60 are mounted on the nearer surface 62 of disc 54, which surface is to be inspected for lack of symmetry in a direction parallel to axle 56. In practice, it is likely that more than two corner reflectors would be utilized in order to achieve a more complete observation of the surface 62. However, the use of only two such reflectors affords a complete understanding of the invention without any unnecessary repetition in the description thereof. Since corner reflectors 58 and 60 are of the same size and shape, the reflecting surfaces thereof will travel in a common plane so long as surface 62 is actually planar. The light thus reflected (upon illumination as by the light source of housing 22 in FIG. 1) will be but a single band and of a color corresponding to the mixture of the colors of the two filters which are respectively mounted on reflectors 58 and 60. Assuming one of these filters to be red and the other blue, if there is axial displacement of a portion of surface 62 on which one or the other of reflectors 58, 60 is mounted, then the reflected light bands will separate and give an appearance similar to that shown in FIG. 5, wherein the blue streak is on the left and the red on the right.

Figure 5:
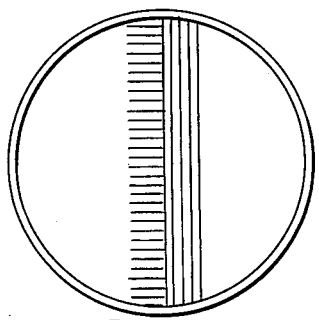
FIG. 5 is a representation of a reflected indication obtained from the apparatus of FIG. 4.
Figure 6:
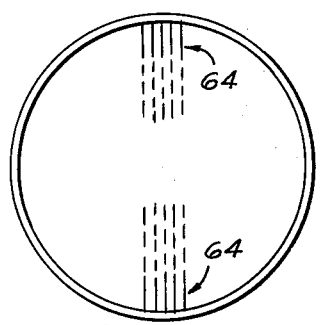
FIG. 6 is a representation of another reflected indication obtained from the apparatus of FIG. 4.

If corner reflectors 58 and 60 are mounted at the periphery of disc 54 as shown in FIG. 4, then such periphery may be tested for radial nonsymmetry in the same manner. The resulting image that would be viewed in the viewing device of housing 22 of FIG. 1 where there is radial nonsymmetry of disc 54 might be that shown in FIG. 6. Of course, only the upper or lower half of the image seen in FIG. 6 will actually be present unless reflectors 58 and 60 are provided with reflecting surfaces and color filters on each side thereof. As shown in FIG. 6, the reflector carrying the red filter is farther away from axle 56 than is the one carrying the blue reflector. Thus, the major portion of the light streak viewed is the violet combination of these two colors, whereas the outer tips of the streak are red, as at 64.

Figure 7:
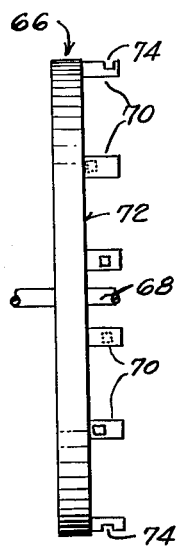
FIG. 7 is an elevation view of a single rotary body showing a modification of the apparatus of FIG. 4.
Figure 8:
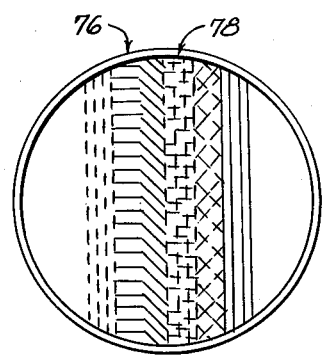
FIG. 8 is a representation of a reflected indication obtained from the apparatus of FIG. 7.
Figure 9:
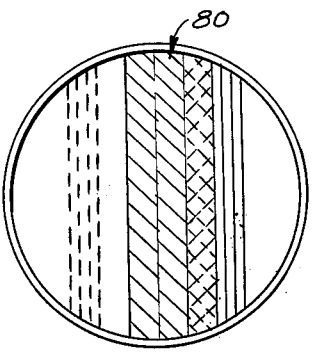
FIG. 9 is a representation of another reflected indication received from the apparatus of FIG. 7.

In the forms of the invention thus far discussed, whenever there has been perfect alignment or symmetry of the parts under test, the light reflected therefrom has been described as falling in a common band, with separate streaks being seen only upon some undesired condition such as nonalignment or nonsymmetry of the parts. As is apparent, however, the invention equally well applies where a plurality of separate color streaks are deliberately obtained where the parts in question are in alignment or where there is no lack of symmetry. In such a case, the undesired condition is represented by one or more missing streaks which would otherwise appear in a normal pattern. One possible arrangement for carrying out this form of the invention is shown in FIG. 7, where a disc 66 or the like is mounted for rotation about an axle 68. A plurality of corner reflectors 70 are mounted thereon as at surface 72 which is to be tested for axial nonsymmetry. The corner reflectors and their respective color filters are arranged to provide a pattern of light bands as shown in FIG. 8 where surface 72 is planar, since the apertures 74 in the several reflectors are staggered in their spacing from the surface 72. If, for example, that radial portion of disc 66 which carries the reflector with the blue filter is axially displaced toward the right (as seen in FIG. 7), then the reflected light patterns will take on the appearance of FIG. 9, wherein the blue streak 76 and the yellow streak 78 of FIG. 8 have combined to form an additional green streak 80.

While the foregoing description of the apparatus of the invention in its various forms has necessarily included a description of several aspects of the operation thereof, the over-all operation of the several forms of the apparatus of the invention will now be described. With light source 34 energized by some suitable means (such as a battery or the like where source 34 is an electric lamp), housing 22 is aimed so as to direct the light reflected by semitransparent mirror 36 in the general direction of the path of travel of the plurality of corner reflectors 20, whether they be mounted on several separate rotating bodies as in the case of the three propeller blades of the helicopter 10 of FIG. 1, or on several different radial elements of a single rotating body as in FIG. 4 and FIG. 7.

Taking light ray 38 as being representative of the many rays of light which are generated by light source 34 and which illuminate mirror 36, when light ray 38 strikes mirror 36 a portion thereof is reflected toward the corner reflector 20 along path 40, while the remaining portion is transmitted through mirror 36 to fall upon the reflecting surface of mirror 46. Since mirrors 36 and 46 are sufficiently nonparallel to reflect light ray 38 along two paths 40 and 48 which converge at the path of travel of corner reflector 20 as it is carried by its respective rotary member, reflector 20 will be iluminated by light reflected from mirrors 36 and 46 simultaneously. The return or reflected paths 42 and 50 for the respective incident paths 40 and 48 are combined into a single light ray 45 after return ray 50 is reflected by mirrors 46 and 36 in turn. Such combination takes place at a point 47 on the under side of semitransparent mirror 36, where return ray 42 is transmitted therethrough, and provides a partial compensation for the losses which occur by virtue of the use of semi-transparent mirror 36. Assuming no other losses, the efficiency of the system would only twenty-five percent where mirror 46 is not employed, since half of the incident light is lost upon each reflection or transmission of the light by semitransparent mirror 36. With the addition of mirror 46, however, a fourth of the light energy that was previously lost is now re-combined with the original energy, and the efficiency is thereby increased to fifty percent. Further, without mirror 46 in use, the nonreflected portion of incident light beam 38 at mirror 36 would in most cases bounce around within the housing and further decrease the efficiency of the optical system by diffusion of the reflected light energy. As an ancillary feature, the addition of mirror 46 provides a range-finding operation where mirror 46 is pivotally mounted on housing 22, and suitable scale means 49 are provided between the mirror and its mount for affording a reading of the linear distance between mirror 46 and the intersection of the two reflected light rays at corner reflectors 20.

As previously stated, the several corner reflectors of the invention may be so mounted on the respective rotating elements as to provide a single band or streak of reflected light where there is no nonalignment or nonsymmetry in the rotating elements, or they may alternatively be mounted so as to provide a plurality of separate and different-colored light bands at the viewing device in the absence of nonalignment or nonsymmetry. In either case, the separate colors of the several bands may more easily be recognized in many instances by means of the use of a color filter wheel 52 or the like. As each of the segments of wheel 52 is brought into registry with the light entering viewing device 44, light of that particular color will be transmitted therethrough, and the remaining light will be substantially blocked. Since the several color segments of wheel 52 correspond in color to the several filters mounted on the corner reflectors, the relative position of the light band reflected by each of the corner reflectors may more easily be determined, especially, for example, where a pair of different-colored bands are substantially superimposed.

The invention has been described above in considerable detail, and particularly with reference to its application to apparatus for sensing nonalignment and nonsymmetry wherein the light energy utilized falls within the visible light spectrum. However, it will be apparent to those skilled in the art that energy of other frequencies may equally well be employed. Further, the light source described herein has been referred to as a self-contained source, whereas such local source may be replaced by suitable means for receiving light energy from some remote source. Additionally, it will be apparent that the several rotating elements referred to herein need not rotate about a single, common axis, but may rotate about several separate axes, provided that such several axes are not so positioned as to prevent the reflection and viewing of light as described. Hence the invention is not to be considered as limited to the particular details given, not to the specific application to which reference has been made during the description of the apparatus, except insofar as may be required by the scope of the appended claims.

What is claimed is:

1. Apparatus for dynamic optical sensing of axial nonsymmetry in a rotating body, comprising a plurality of reflector means mounted on such body in spaced-apart relationship at a corresponding plurality of points on such body which lie in a common plane of rotation thereof in the absence of axial nonsymmetry, means for directing a beam of polychromatic light upon such body to illuminate said reflector means, light filter means mounted on such body at each of said reflector means to filter the light reflected therefrom, each of said filter means passing a different portion of the spectrum of the incident light and means for viewing said reflected light, whereby such of said reflector which do not lie in said common plane may be identified by means of the wavelength of the light reflected thereby.

2. Apparatus for dynamic optical sensing of radial nonsymmetry in a rotating body, comprising a plurality of reflector means mounted on such body in spaced-apart relationship at a corresponding plurality of points on such body which lie in a common cylindrical surface of rotation thereof in the absence of radial nonsymmetry, means for directing a beam of polychromatic light upon such body to illuminate said reflector means, light filter means mounted on such body at each of said reflector means to filter the light reflected therefrom, each of said filter means passing a different portion of the spectrum of the incident light, and means for viewing said reflected light, whereby such of said reflector means which do not lie in said common cylindrical surface may be identified by means of the wavelength of the light reflected thereby.

3. Apparatus for dynamic optical sensing of nonalignment of one or more of a plurality of rotating members which have corresponding elements that are intended to rotate in a common plane, comprising reflector means mounted on corresponding elements of said members whereby corresponding elements of the several reflector means rotate in a common plane only when such members are in alignment; means for directing polychromatic light upon such members to illuminate the reflecting surfaces of said reflector means, a light filter associated with at least all but one of said reflector means to color the light reflected thereby in a manner discernibly different from the light reflected by each of the other reflector means, and means for viewing the light reflected by said reflectors in turn towards a common observation region.

4. Apparatus in accordance with claim 3, wherein each of said reflector means comprises a corner reflector, and in which said means for directing light comprises a divergent-beam light source; a planar semi-reflecting member illuminated by said light source and adapted to reflect a portion of the incident light toward said reflector means and to transmit another portion of the incident light therethrough, a planar reflecting member illuminated by said divergent light source through said semi-reflecting member and adapted to reflect such other portion of the incident light toward said reflector means; and in which said viewing means comprises a device adapted to receive light reflected by said reflector means both by transmission through said semi-reflecting member and by reflection at said planar reflecting member and said semi-reflecting member in turn.

5. Apparatus for dynamic optical sensing of the displacement, from predetermined rotational paths, of one or more of a plurality of rotating members, comprising reflector means mounted on corresponding elements thereof whereby corresponding elements of the several reflector means rotate in paths having a fixed relation to said predetermined paths; means for directing polychromatic light upon such members to illuminate the reflecting surfaces of said reflector means, a light filter associated with at least all but one of said reflector means to color the light reflected thereby in a manner discernibly different from the light reflected by each of the other reflector means, and means for viewing the light reflected by said reflectors in turn towards a common observation region.

6. Apparatus in accordance with claim 5, in which said viewing means includes selective-color filtering means for selectively absorbing the light arriving at said viewing means from certain of said reflector means.

References Cited in the file of this patent
UNITED STATES PATENTS

| Re. 18,937 | Oestnaes et al. | Sept. 5, 1933 |
| 2,455,053 | Flint | Nov. 30, 1948 |
| 2,806,402 | Ferris | Sept. 17, 1957 |